United States Patent [19]
Daidou et al.

[11] Patent Number: 5,806,310
[45] Date of Patent: Sep. 15, 1998

[54] EXHAUST PURIFICATION APPARATUS

[75] Inventors: Shigeki Daidou, Nishio; Kiyonori Sekiguchi; Yoshiyuki Ito, both of Okazaki; Shinya Hirota, Susono; Masahito Shibata, Mishima, all of Japan

[73] Assignees: Nippon Soken, Inc., Nishio; Toyota Jidosha Kabushiki Kaisha, Toyota, both of Japan

[21] Appl. No.: 629,599

[22] Filed: Apr. 9, 1996

[30] Foreign Application Priority Data

Apr. 10, 1995 [JP] Japan ................................. 7-084212

[51] Int. Cl.$^6$ ....................................................... F01N 3/10
[52] U.S. Cl. ................................. 60/286; 60/301; 60/303
[58] Field of Search ............................... 60/286, 303, 301

[56] References Cited

U.S. PATENT DOCUMENTS

| | | | |
|---|---|---|---|
| 4,404,796 | 9/1983 | Wade | 60/303 |
| 5,189,876 | 3/1993 | Hirota et al. | 60/33 |
| 5,417,059 | 5/1995 | Hartel et al. | 60/303 |
| 5,456,079 | 10/1995 | Langen | 60/303 |

FOREIGN PATENT DOCUMENTS

| | | | |
|---|---|---|---|
| 2095607 | 2/1972 | France . | |
| 4239079 | 5/1994 | Germany . | |
| 58-202324 | 11/1983 | Japan . | |
| 59-122721 | 7/1984 | Japan . | |
| 60-128918 | 7/1985 | Japan . | |
| 63-120811 | 5/1988 | Japan | 60/286 |
| 63-198717 | 8/1988 | Japan . | |
| 4-175417 | 6/1992 | Japan . | |
| 4-214918 | 8/1992 | Japan . | |
| 5-044444 | 2/1993 | Japan . | |
| 5-302509 | 11/1993 | Japan . | |

*Primary Examiner*—Sheldon Richter
*Attorney, Agent, or Firm*—Cushman Darby Cushman IP Group of Pillsbury Madison & Sutro LLP

[57] ABSTRACT

An HC (hydrocarbon) supplementing device is mounted in an exhaust purification device of an internal combustion engine, wherein the amount of HC in the fuel to be added is automatically adjusted to a degree corresponding to the operating conditions of the engine. Accordingly, the supply of just enough HC becomes possible without the use of a complex mechanism for adjusting the supply of HC, and the exhaust gas can be sufficiently purified without wasting fuel.

38 Claims, 10 Drawing Sheets

EXHAUST PURIFICATION APPARATUS

BACKGROUND OF THE INVENTION

1. Field of the Invention

The present invention relates to a hydrocarbon supplementing device for additionally supplying hydrocarbons (abbreviated as HC) into an exhaust gas flowing into an exhaust purification device provided in an exhaust system of an internal combustion engine for assisting the action of the exhaust purification device.

2. Description of the Related Art

A catalyst for purifying $NO_x$ (abbreviated as $NO_x$ catalyst) is one example of a catalyst for reducing the harmful components contained in the exhaust gas of an internal combustion engine such as a diesel engine. For this catalyst, the $NO_x$ purification rate, which represents the efficiency of removal of $NO_x$ by that catalyst, changes due to the influence of various factors which change along with the operating conditions of the engine, for example, the inflowing gas temperature (temperature of the exhaust gas flowing into the $NO_x$ catalyst), SV ratio (spatial velocity, that is, catalyst volume/gas flow rate), HC concentration (concentration of hydrocarbons contained in the exhaust gas flowing into the $NO_x$ catalyst), quality of HC (number of carbon atoms of hydrocarbon molecule of increased HC), etc.

FIG. 6 shows the relationship between the $NO_x$ purification rate and the inflowing gas temperature assuming a constant HC concentration and SV ratio. As seen from this figure, when the inflowing gas temperature is within the constant temperature range indicated as T, the purification rate of the $NO_x$ catalyst becomes conspicuously high compared with a case where the temperature of the inflowing gas is within a temperature range lower or higher than this. This means that there is an optimum temperature range for obtaining a high $No_x$ purification rate in the temperature of the inflowing gas. The range T of the temperature of the inflowing gas with which the $NO_x$ purification rate becomes high becomes the preferred condition for supply of the HC to the $NO_x$ catalyst.

The relationship between the $NO_x$ purification rate of the catalyst and the spatial velocity, that is, the SV ratio defined as the catalyst volume (1) divided by the flow rate of the inflowing gas (liter/h), measured assuming a constant HC concentration and a temperature of the inflowing gas of a temperature giving the maximum purification rate in the $NO_x$ catalyst, is shown in FIG. 7. As seen from this figure, there is a tendency for the $NO_x$ purification rate to be gradually lowered when the SV ratio becomes higher.

The relationship between the $NO_x$ purification rate and the HC concentration is shown in FIG. 8. As seen from this figure, the $NO_x$ purification rate generally tends to become higher along with an increase of the HC concentration in the exhaust gas, but is of a nature that when the HC concentration exceeds a certain zone of concentration, the degree of rise of the $NO_x$ purification rate is slowed. The region D of HC concentration where the characteristic curve in FIG. 8 greatly changes can become a target value of the concentration of the HC supplied.

Finally, the relationship between the purification rate of the $NO_x$ catalyst and the number of carbon atoms of the HC molecule is shown in FIG. 9. When the number of carbon atoms per molecule of hydrocarbon contained in the exhaust gas is small, that is, the exhaust gas is composed of only light hydrocarbons, a sufficient $NO_x$ purification rate cannot be obtained, but in contrast, where the exhaust gas is composed of only heavy hydrocarbons and the number of carbon atoms per molecule is too large, the $NO_x$ purification rate tends to be rather low. It is seen that there is an optimum range for obtaining a high $NO_x$ purification rate also for the number of carbon atoms of hydrocarbon.

Accordingly, in a normal operating state where the operating conditions of the engine greatly change, to constantly secure a high $NO_x$ purification rate, it becomes necessary to precisely control the increase or decrease of the amount of HC to be additionally supplied into the exhaust gas for adjusting for example the HC concentration in accordance with the change of the operating condition of the engine. Therefore, as disclosed in for example Japanese Unexamined Patent Publication (Kokai) Nos. 4-175417 and 4-214918, it becomes indispensable to perform complex control by providing a sophisticated electronic control unit (ECU).

However, sophisticated control by an ECU as seen in the above related art induces a rise of cost in not only the ECU, but also various portions of the control system related to it. Consequently, a rise of the costs of the automobile mounting this therein is unavoidable.

SUMMARY OF THE INVENTION

Accordingly, in order to solve these problems in the related art, an object of the present invention is to provide a relatively simple and convenient and cheaper control means with which a $NO_x$ purification rate sufficient for practical use can be obtained by intensively controlling the factors which have a great influence upon the $NO_x$ purification rate, that is, the temperature of the inflowing gas and HC concentration.

The present invention provides an HC supplementing device mounted in the exhaust purification device of the engine disclosed in the claims as a means of achieving the above object.

Several key features are exploited in the present invention first the feed pump which pressurizes the fuel to a relatively low pressure and supplies the same to a fuel injection pump generates a feed pressure of fuel of a magnitude which changes in accordance with the operating conditions of the engine, for example, the engine speed. Secondly, one part of the fuel of that feed pressure is taken out to an HC supply line by an HC take-out portion. Third, the pressure is adjusted by a throttle portion provided in the middle of the supply line and, fourth, the fuel is supplied to an HC supplying device provided at a portion upstream of the exhaust purification device of the exhaust system.

The fuel mixed into the exhaust gas from the HC supplying device and supplied to the exhaust purification device not only is used as a hydrocarbon (HC) serving as a reduction agent for reducing the harmful oxides such as $NO_x$ in the exhaust gas, but also, when the catalyst is low in temperature and not activated, heats the catalyst by the heat of oxidation of the HC and makes the temperature of the catalyst reach the activation temperature. The HC is useful for converting the harmful substances in the exhaust gas to harmless substances by assisting the action of the catalyst of the exhaust purification engine in this way. According to the means of the present invention, the amount of hydrocarbon of the fuel to be added is automatically adjusted to a degree corresponding to the operating conditions of the engine. Accordingly, the supply of just enough HC becomes possible without the use of a complex mechanism for adjusting the amount of supply of HC and the exhaust gas can be sufficiently purified without waste of the fuel.

BRIEF DESCRIPTION OF THE DRAWINGS

The present invention will become more apparent by the following detailed explanation of the preferred embodiments made with reference to the accompanying drawings, in which.

DESCRIPTION OF THE PREFERRED EMBODIMENTS

Figure 1:
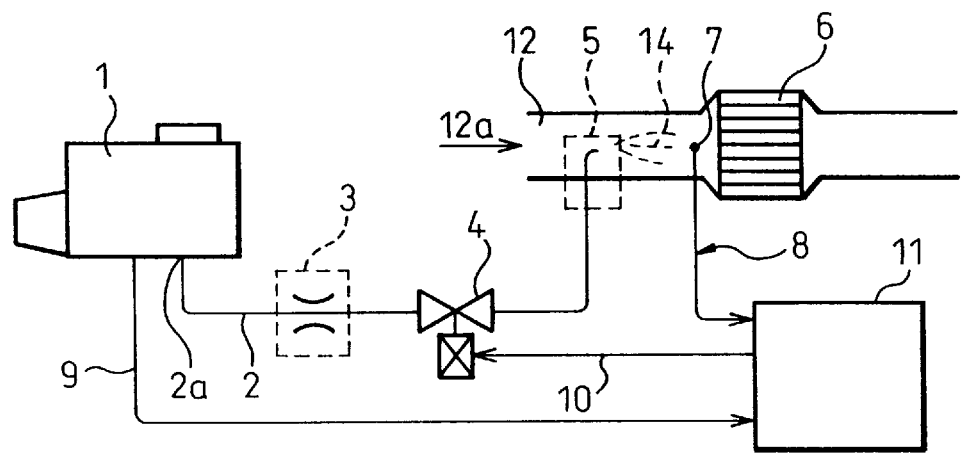
FIG. 1 is a structural view of a system of a first embodiment of the present invention.
Figure 2:
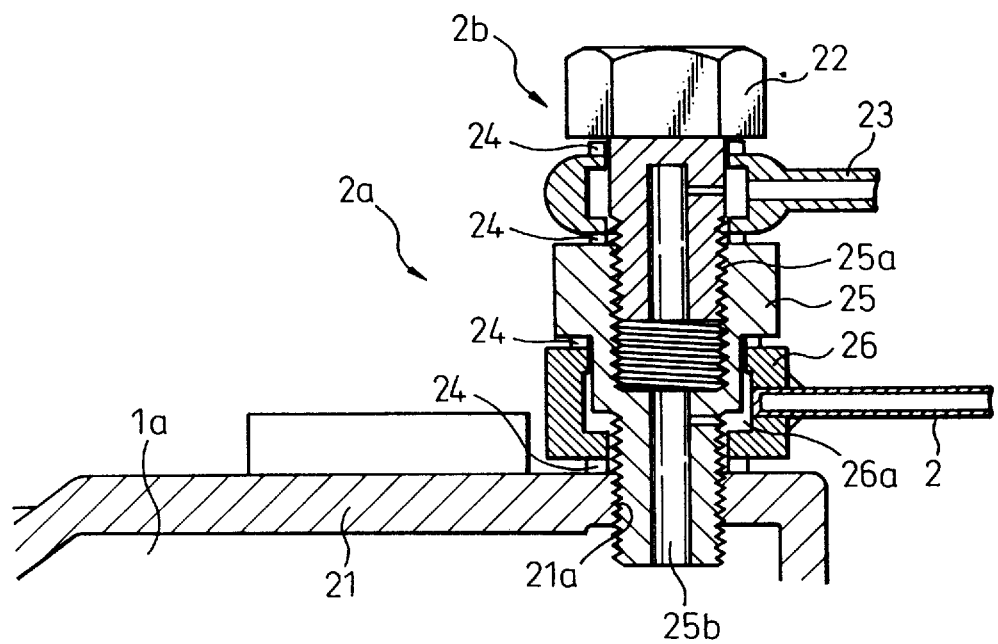
FIG. 2 is a sectional view showing an enlargement of the HC takeout portion in the first embodiment.
Figure 3:
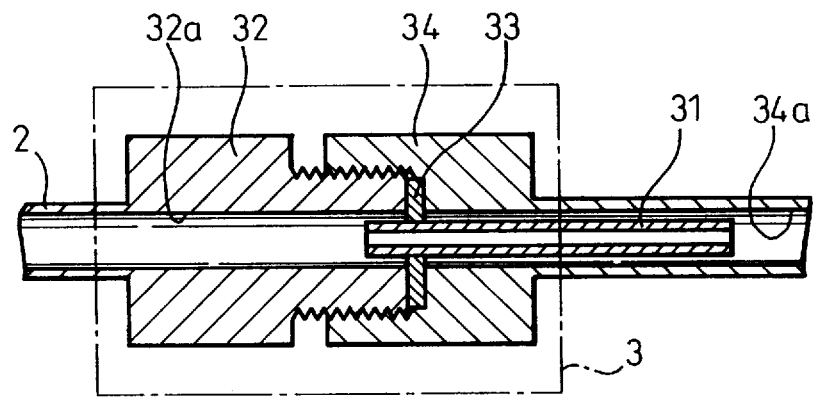
FIG. 3 is a sectional view showing an enlargement of the throttle portion in the first embodiment.
Figure 4:
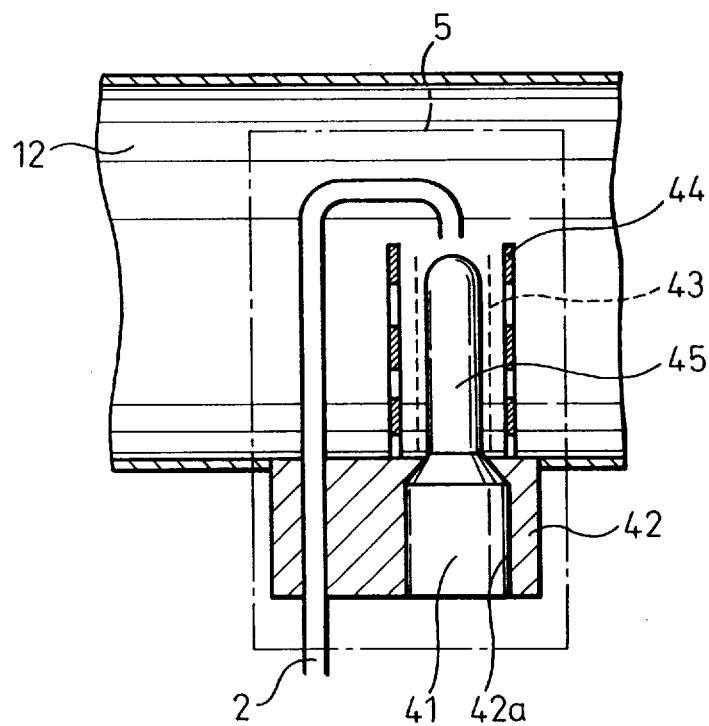
FIG. 4 is a sectional view showing an enlargement of the HC supplying device in the first embodiment.

An overall configuration of the system including the HC supplementing device according to the first embodiment of the present invention is schematically shown in FIG. 1. FIG. 2 to FIG. 4 show enlargements of parts of the system of the first embodiment as cross-sections.

Figure 5:
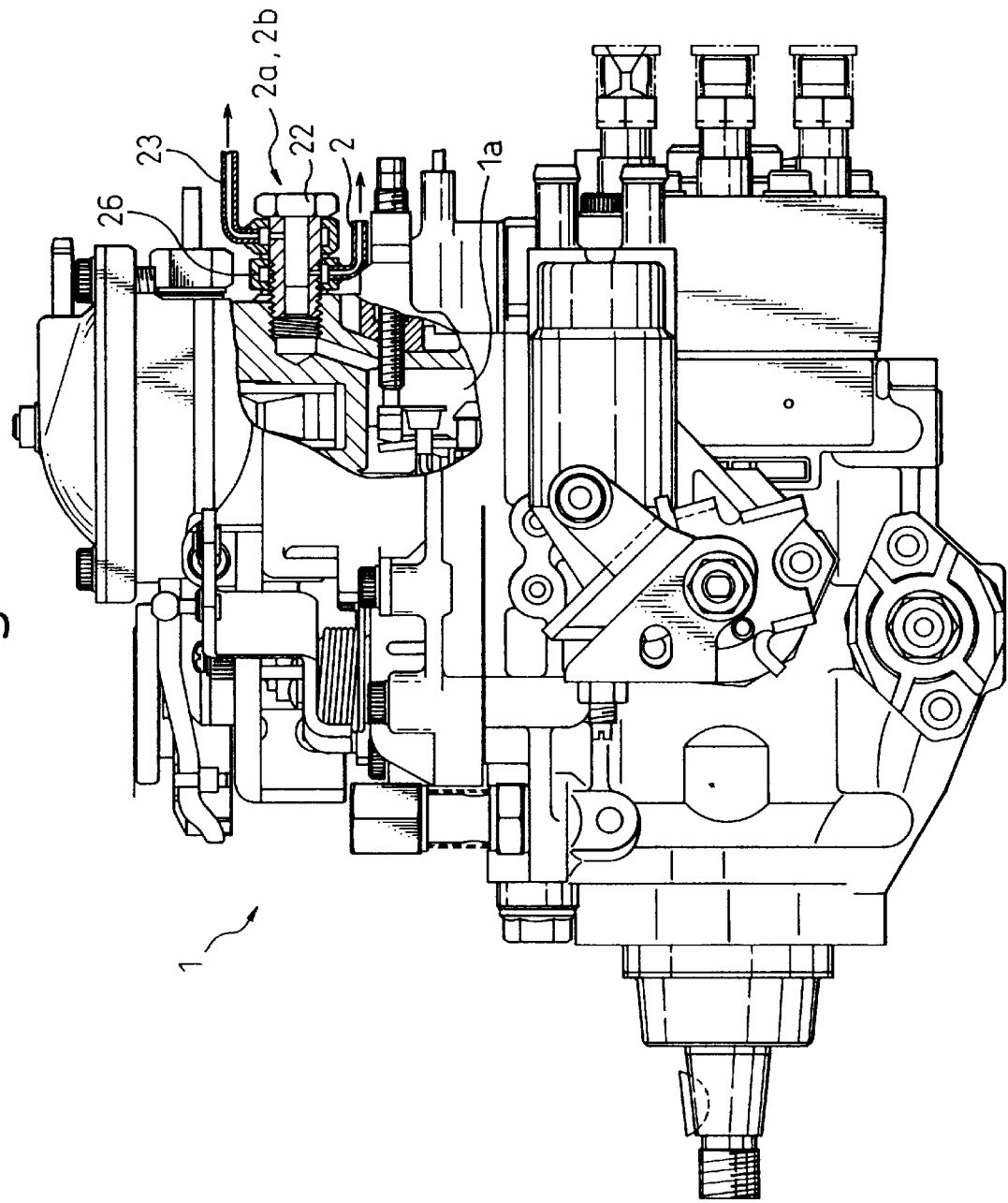
FIG. 5 is a view showing the structure of the entire fuel injection pump and a modification of the HC takeout portion.

A fuel injection pump 1 has a mechanical fuel adjusting device. The overall structure is shown in FIG. 5. Although not illustrated in FIG. 5, as is well known, the fuel injection pump 1 is provided with a fuel feed pump inside this. Before being pressurized to a high pressure by a pump plunger, the fuel is pressurized up to a pressure of about 1 to 5 kgf/cm² (feed pressure) by the feed pump and filled in a low pressure chamber 1a in the fuel injection pump 1. The feed pump is directly driven by the engine, so the feed pressure changes in accordance with the change of the engine speed.

Therefore, in the first embodiment, one part of the fuel (light oil) of the feed pressure in the low pressure chamber 1a is taken out from the HC takeout portion 2a communicated with the supply line 2 and used as the HC (hydrocarbon) for additionally supply into the exhaust gas in the HC supplementing device.

Figure 8:
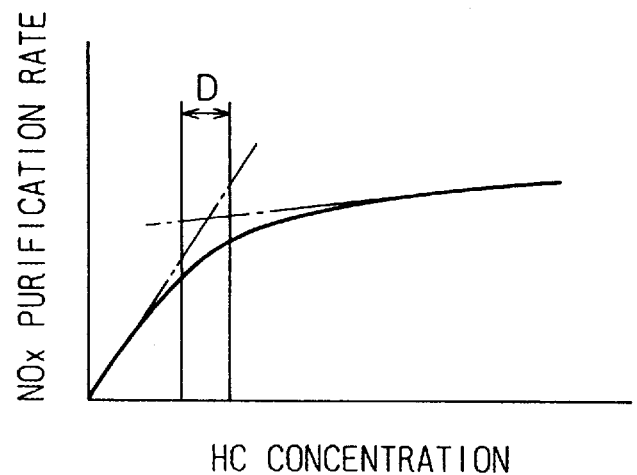
FIG. 8 is a graph illustrating the relationship between an HC concentration and the $NO_x$ purification rate.
Figure 9:
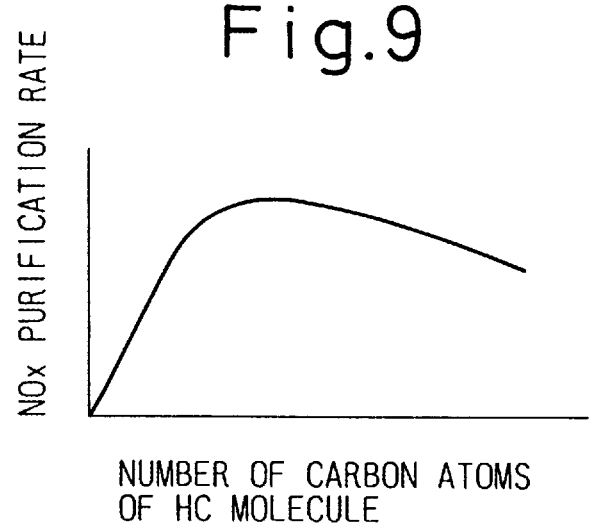
FIG. 9 is a graph illustrating the relationship between the quality of HC and the $NO_x$ purification rate.

The fuel taken out from the HC takeout portion 2a is restricted in flow rate by a throttle 3 so that the HC concentration is adjusted so that as high a $NO_x$ purification rate as possible is obtained in the characteristic shown in FIG. 8. The control valve 4, which also acts as a safety valve, is controlled in operation to start the supply and stop the supply of fuel. The fuel (HC) is supplied so as to be uniformly mixed into the flow 12a of the exhaust gas upstream of the catalyst 6 such as the catalyst for purification of $NO_x$ from the HC supplying device 5 attached to the exhaust system of the engine, for example, the exhaust pipe 12, by a mechanical means.

The simple configuration control valve 4, which is a solenoid type opening/closing valve, performs the opening/closing operation when controlled by a simple configuration control circuit 11 outputting a mere binary control signal for opening/closing (ON - OFF signal) 10. For the input signal for control, although not illustrated, a rotary variable resistor is provided in the fuel injection pump 1 as a sensor for detecting the pivot position of the accelerator lever of the fuel injection pump 1. A voltage value or current value having a magnitude corresponding to the pivot position of the accelerator lever output from this is input to the control circuit 11 as the accelerator pedal depression signal 9 indicating the load of the engine.

Further, an exhaust temperature signal 8 indicating the temperature of the exhaust gas flowing into the catalyst 6, that is, the inflowing gas temperature, is detected by an exhaust temperature sensor 7 such as a thermistor attached to the exhaust system just before the catalyst 6, for example, at the exhaust pipe 12, by a mechanical means, transformed to a voltage value or a current value, and input to the control circuit 11.

A comparator is provided in the control circuit 11 to compare and decide whether or not the input exhaust temperature signal 8 and the accelerator pedal depression signal 9 coincide with the conditions for supplying HC which are preliminarily set.

Next, an explanation will be made of a concrete configuration of the HC supplementing device of the first embodiment. First, the structure of the HC takeout portion 2a for taking the fuel from the low pressure chamber 1a of the fuel injection pump 1 to the supply line 2 of the HC supplementing device is illustrated in FIG. 2. In this example, to return one part of the fuel to a not illustrated fuel tank in order to adjust the pressure of the fuel existing in the low pressure chamber 1a of the fuel injection pump 1, the HC takeout portion 2a is mounted in a so-called "drain" portion 2b which is usually always provided in this type of fuel injection pump.

Namely, usually, a hollow drain bolt 22 is directly screwed into a screw hole 21a provided in a wall portion 21 surrounding the low pressure chamber 1a of the fuel injection pump 1 and, at the same time, an end portion of a drain pipe 23 communicated with the fuel tank is attached to the wall portion 21 by that drain bolt 22 while sandwiching the packing 24, thereby to constitute the drain portion 2b. In this example, first, a hollow joint bolt 25 is screwed into the screw hole 21a, and the drain bolt 22 is screwed into the screw hole 25a formed in the head portion thereof. For this reason, the end portion of the drain pipe 23 is sandwiched between the head portion of the drain bolt 22 and the head portion of the joint bolt 25 via the packing 24 and fixed.

An annular hollow member 26 called a joint nut (it is not always necessary to form the screw hole) is fit over the joint bolt 25 and sandwiched between the head portion of the joint bolt 25 and the wall portion 21 via the packing 24 and affixed. An internal space 26a of the joint nut 26 is communicated with the low pressure chamber 1a of the fuel injection pump 1 through a passage 25b at the center of the hollow joint bolt 25 and, at the same time, the pipe of the supply line 2 is connected from the outside, whereby one part of fuel in the low pressure chamber 1a can be taken out to the HC supplementing device. Accordingly, the HC takeout portion 2a illustrated in FIG. 2 is constituted by the joint bolt 25, the joint nut 26, the packing 24, etc. But it is also possible to change and use the HC takeout portion 2a and the drain portion 2b.

Note that, the structure of the HC takeout portion 2a and the drain portion 2b in FIG. 5, showing the overall structure of the fuel injection pump 1, slightly differs from that shown in FIG. 2. While a modification of the first embodiment, in the example shown in FIG. 5, the length of the drain bolt 22 becomes longer than that of the usual one, and the tip thereof is screwed into the screw hole formed in the main body of the fuel injection pump 1. Between the head portion of the drain bolt 22 and the main body of the pump 1, both of the tip portion of the drain pipe 23 and the portion corresponding to the joint nut 2 shown in FIG. 2 are sequentially attached on the same drain bolt 22 while sandwiching packing therebetween, so the structure of the HC takeout portion 2a and the drain portion 2b becomes somewhat simpler.

FIG. 3 illustrates the concrete structure of a throttle 3 provided at one part of the HC supply line 2. In this example, a small-diameter orifice pipe 31 cut to a predetermined length for throttling the flow of fuel is attached to the internal portion of the connector provided in the middle of the supply line 2 in a fixed manner. One hollow member 32 constituting the connector is screwed into the other hollow member 34 of the connector while sandwiching an orifice washer 33 therebetween, so the orifice washer 33 can become a partition wall between the passage 32a inside one hollow member 32 and the passage 34a inside the other hollow member 34. The orifice pipe 31 is attached to the hole of the orifice washer 33 by welding and extended from the internal portion of the passage 32a toward the internal portion of the passage 34a.

The concrete structure of the HC supplying device 5 which is attached to the exhaust pipe 12 for additionally supplying fuel (HC) into the exhaust pipe 12 is illustrated in FIG. 4. In the HC supplying device 5 in this example, the base portion of an electrical heat generator 41 positioned at the center thereof is supported while being screwed into the screw hole 42a of the block-shaped case 42. The case 42 is attached to the wall of the exhaust pipe 12 by welding or another method. Further, a metal mesh cylindrical body 43 is wound one or more times around the heat generating portion 45 of the heat generator 41. Further, a protective cylindrical body 44 made of a punched metal, that is, a metal plate having small apertures, is arranged so as to surround the outside thereof. The cylindrical body 44 is supported by the case 42 in a fixed manner by welding or another method. Also, the cylindrical body 43 of the metal mesh is directly supported by the case 42 or indirectly supported by an attachment to the cylindrical body 44. The terminal end of the HC supply line 2 introduced to the interior of the HC supplying device 5 is opened toward the heat generating 45 of the heat generator 41.

Below, an explanation will be made of the operation of the HC supplementing device of the first embodiment. The characteristic feature of the present invention resides in the fact that the control of the supply of HC is simply carried out by (1) the control of the temperature of the inflowing gas to the catalyst and (2) the control of the concentration of supplied HC, and accordingly also the first embodiment provides these two characteristics.

In the case of the first embodiment, the control of the temperature of the inflowing gas is carried out as follows. The temperature of the exhaust gas flowing into the catalyst 6 is measured by the exhaust temperature sensor 7, the exhaust temperature signal 8 is input to the control circuit 11, and the control circuit 11 decides whether or not the temperature of the inflowing gas at this time is within the temperature range T which is the condition for supplying HC shown in FIG. 6. When the conditions for supplying HC stand, the control signal 10 is issued and the control valve 4 is made to open. As a result, the low pressure chamber 1a of the fuel injection pump 1 pumps fuel (HC) given a feed pressure of a height determined according to the operating conditions (mainly the rotational speed) of the engine at that time enters from the HC takeout portion 2a into the supply line 2, the fuel is restricted in its flow rate by the throttle 3, and then the fuel flows out from the HC supplying device 5 into the exhaust pipe 12.

Figure 10:
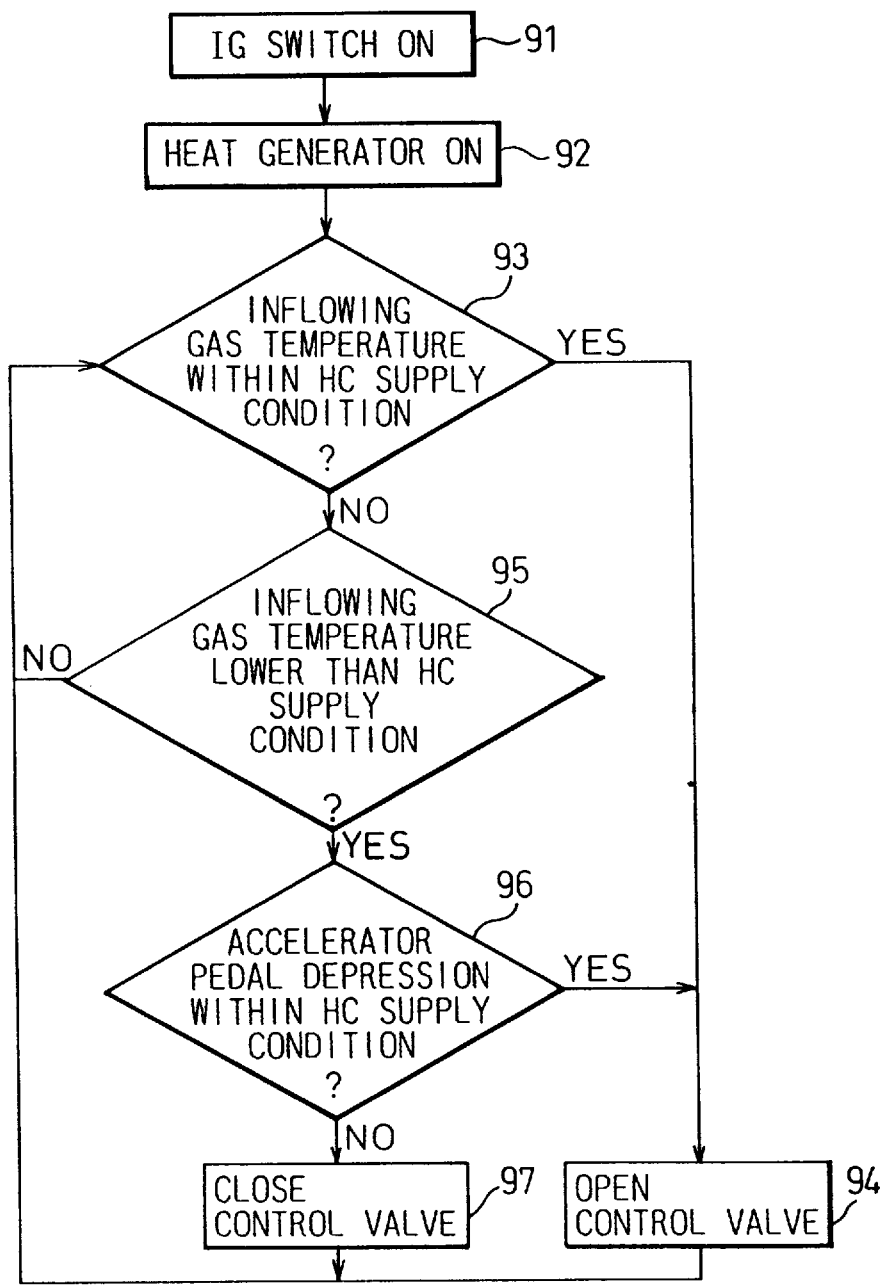
FIG. 10 is a flow chart illustrating the procedure of control.

The flowing fuel contacts the heat generating portion 45 of the heat generator 41 which is supplied with electric current and generates heat and the cylindrical body 43 of metal mesh surrounding this and immediately vaporizes, is mixed into the exhaust gas flowing in the exhaust pipe 12, and flows into the catalyst 6. By mixing the vaporized fuel of the HC into the exhaust gas, the action by the catalyst 6 of purifying the $NO_x$ in the exhaust gas is assisted. The amount of fuel supplied in this way corresponds to the degree of the engine speed at that time and accordingly the pressure of the fuel in the low pressure chamber 1a of the fuel injection pump 1 and in the supply line 2. As the speed of the engine becomes higher, a larger amount of fuel is additionally supplied from the HC supplying device 5 into the exhaust gas. This corresponds to the fact that the higher the speed of the engine, the larger the amount of $NO_x$ to be generated. FIG. 10 shows the above operation in a flow chart showing the procedure of the control operation of the control circuit 11.

When the ignition switch (key switch) of the engine is turned on, at step 91, the control program of the control circuit 11 starts. At step 92, the supply of electric current to the heat generator 41 is commenced. At step 93, it is decided whether or not the inflowing gas temperature (exhaust temperature signal 8) to the catalyst 6 detected by the exhaust temperature sensor 7 is within the temperature range of the predetermined condition for supplying HC such as the range indicated as T in FIG. 6.

When it is decided that the temperature of the gas flowing into the catalyst 6 is within the temperature range T and the condition for supplying HC stands at step 93, at step 94, the control valve 4 is opened. By this, from the low pressure chamber 1a of the fuel injection pump 1, fuel given a feed pressure corresponding to the speed of the engine at that time is supplied from the HC supplying device 5 to the catalyst 6 to assist the purification of $NO_x$. Accordingly, the amount of supply of HC at this time becomes an amount corresponding to the height of the speed of the engine.

In the decision at step 93, when it is decided that the temperature of the gas flowing into the catalyst 6 is not within the temperature range T, the processing routine proceeds to step 95, at which it is decided whether or not the temperature of the inflowing gas at that time is the temperature range T of the condition for supplying HC or less. When it is not lower than the temperature range T, the processing routine returns to step 93, and the decision is repeated, but when it is decided that it is lower than the temperature range T, the processing routine proceeds to step 96, at which it is decided whether or not the accelerator pedal depression signal 9 indicating the engine load at that time is in the region shown with hatching in the graph of FIG. 11.

Figure 6:
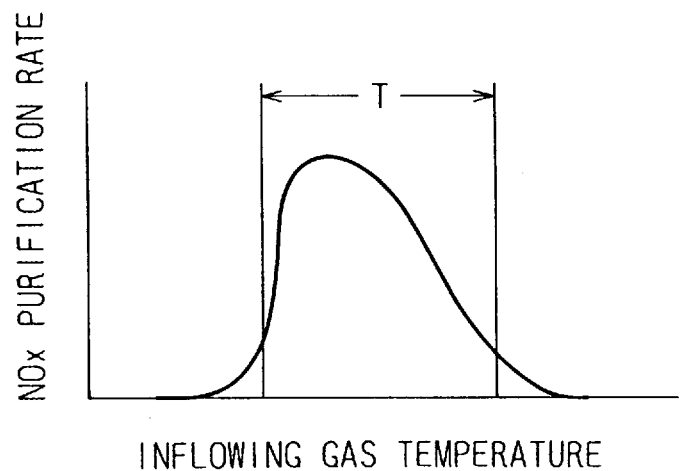
FIG. 6 is a graph illustrating the relationship between the temperature of the inflowing gas and $NO_x$ purification rate.
Figure 7:
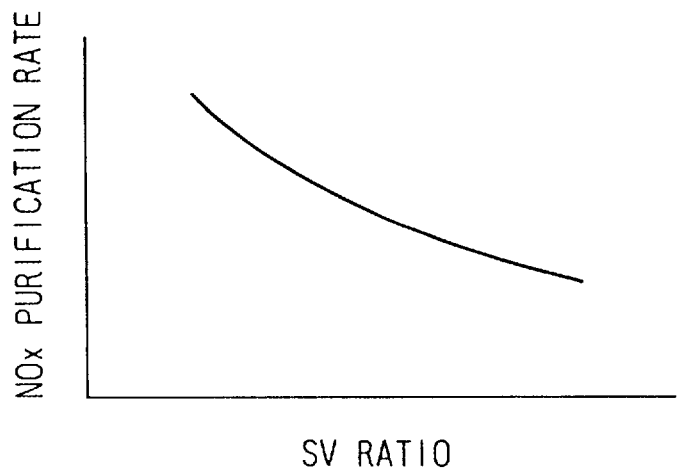
FIG. 7 is a graph illustrating the relationship between an SV ratio and the $NO_x$ purification rate.
Figure 11:
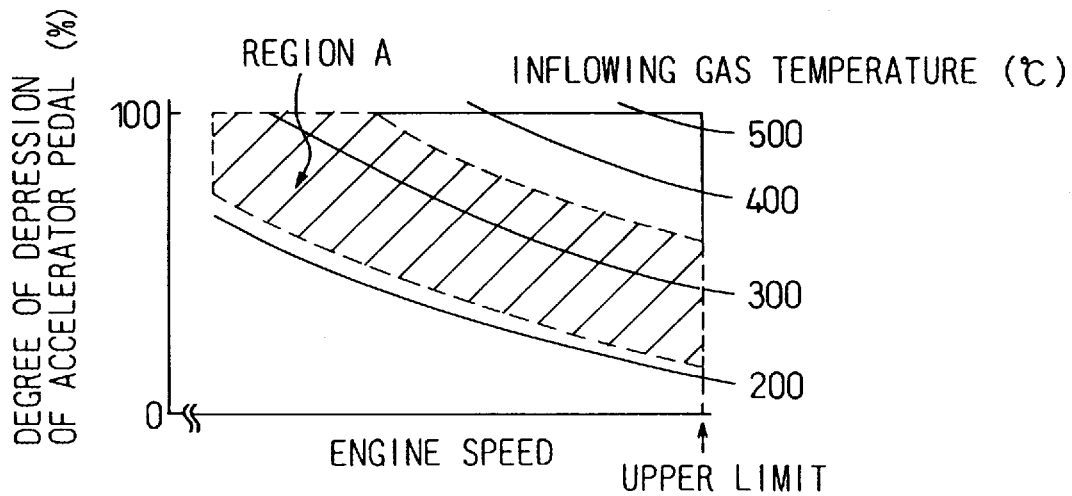
FIG. 11 is a graph illustrating the condition for supplying HC according to a degree of depression of an accelerator pedal and the engine speed.

The characteristic curve of FIG. 11 is for examining the degree of depression of the accelerator pedal with which the temperature of the gas flowing into the catalyst 6 is within the range indicated as T in FIG. 6 with respect to the change of the engine speed for deciding the condition for supplying HC (region A) by degree of depression of the accelerator pedal corresponding to the engine load and the engine speed. In an area lower than the region A, the catalyst is not activated, so even if the supply of HC is carried out, it becomes useless, and on the upper side, the purification of $NO_x$ is not carried out, so the HC is not supplied. Note, there is an upper limit on use in the speed of engine to be used and the degree of depression of accelerator pedal, so as the region A, a combination of the degree of depression of the accelerator pedal in the region shown with hatching and the speed of engine can be used.

At step 96, when it is decided that the accelerator pedal depression signal 9 is within the hatched region of FIG. 11 with respect to the speed of the engine, that is, the engine is in a high load state such as acceleration and the accelerator pedal depression is within the range of the condition for supplying HC, the processing routine proceeds to step 94, at which the control valve 4 is made to open and the fuel is supplied into the exhaust gas flowing from the HC supplying device 5 into the catalyst 6. Due this, the control delay due to the temperature of the inflowing gas and engine speed is compensated and the increase of amount of HC is quickly carried out. Even if temporary, a lowering of the $NO_x$ purification rate of the catalyst 6 is prevented.

When it is decided at step 96 that the degree of depression of the accelerator pedal is not within the range of the condition for supplying HC, the processing routine proceeds to step 97, at which the control valve 4 is made to open, the supply of the fuel from the HC supplying device 5 is interrupted, and the deterioration of the fuel consumption and overheating of the exhaust system are prevented.

Figure 12:
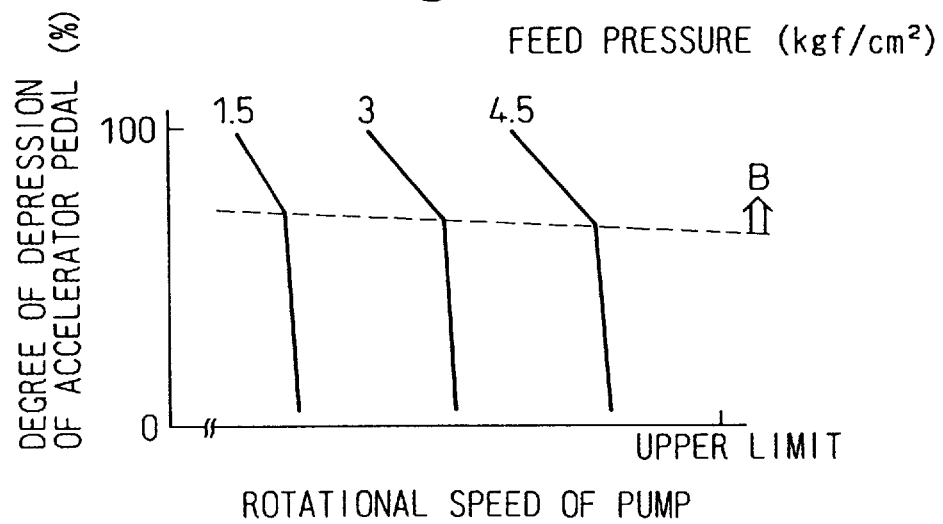
FIG. 12 is a graph illustrating the change of the feed pressure corresponding to the change of the degree of depression of the accelerator pedal of the fuel injection pump and the rotational speed of the pump.

Next, an explanation will be made of the operation for control of the concentration of supply of HC in the HC supplementing device of the first embodiment. This control is automatically carried out by the change of the feed pressure of the fuel injection pump 1 and the throttling action of the throttle 3 and is control in accordance with the speed of the engine and the degree of depression of the accelerator pedal, that is, the engine load. As shown in FIG. 12, the feed pressure in the low pressure chamber la of the fuel injection pump 1 changes according to the rotational speed of the fuel injection pump 1 and the position of the load sensing timer moving in accordance with the degree of depression of the accelerator pedal.

The structure of the load sensing timer is one which is well known and used in a fuel injection pump of the distribution type, so a detailed explanation is not required, but the load sensing timer of the fuel injection pump operates only in the relatively high load operation state of the diesel engine and a case where the degree of depression of the accelerator pedal is in the region B higher than the broken line, so the relationships between the rotational speed of the fuel injection pump 1 where the feed pressure becomes for example, 1.5 kgf/cm², 3 kgf/cm², or 4.5 kgf/cm² and the degree of depression of the accelerator pedal become as shown by the bent lines shown in FIG. 12, respectively.

Figure 13:
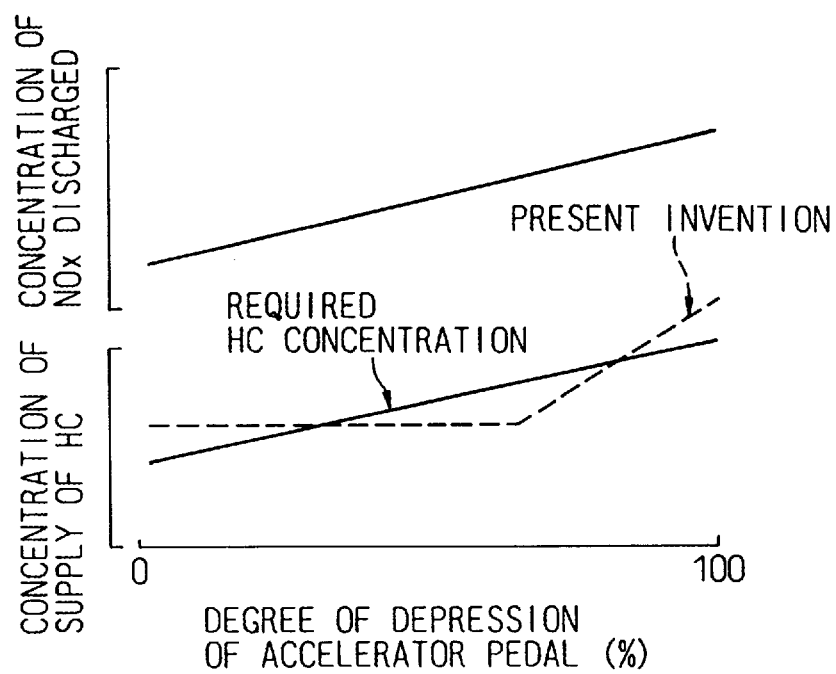
FIG. 13 is a graph illustrating the change of the HC concentration and the $NO_x$ discharge concentration corresponding to the change of the degree of depression of the accelerator pedal.

In the first embodiment, a constant throttle like the throttle 3 is provided in the middle of the supply line 2, and the flow rate of the HC supplied from the HC supplying device 5 is restricted, whereby the change of the feed pressure, which rises in proportion to the engine speed, can be adjusted so that the HC concentration in the exhaust gas becomes a predetermined value, that is, an HC concentration of for example 1000ppmc, which is preferred for the catalyst 6, is obtained as shown in FIG. 13. Further, where the engine speed is constant and only the degree of depression of the accelerator pedal is increased, for example, as shown in FIG. 13, the concentration of $NO_x$ discharged from the engine is increased along with an increase of the degree of depression of the accelerator pedal. Desirably the HC concentration which is required becomes larger according to an increase of the concentration of $NO_x$. By the operation of the load sensing timer, the feed pressure at the same rotation speed is increased as shown in FIG. 12, and accordingly it is possible to handle changes of the degree of depression of the accelerator pedal like the bent line indicated by the broken line in FIG. 13. Note that, the throttle 3 performs a constant throttling action, but even if a specific fixed throttle is not provided, by reducing the sectional area of at least one part of the HC supplying line 2, the same effect as that by a fixed throttle can be obtained.

A second embodiment of the present invention will be explained by using FIG. 14 to FIG. 16. In the first embodiment, as the HC to be supplied to the catalyst 6, fuel of the feed pressure was directly taken out from the HC takeout portion 2a provided in the low pressure chamber 1a of the fuel injection pump 1 and guided to the HC supplying device 5 through the fixed throttle 3, but the second embodiment is characterized in that the fuel of the low pressure chamber la is similarly taken out, but the HC takeout portion is provided in the oil pressure type automatic timer used for adjusting the injection timing of the fuel by the feed pressure. By providing a variable throttle portion with an opening which changes in area by the movement of the timer piston, the precision of the adjustment function of the fixed throttle 3 is improved. Alternatively, the HC is supplied to the HC supplying device in place of the fixed throttle 3.

Figure 14:
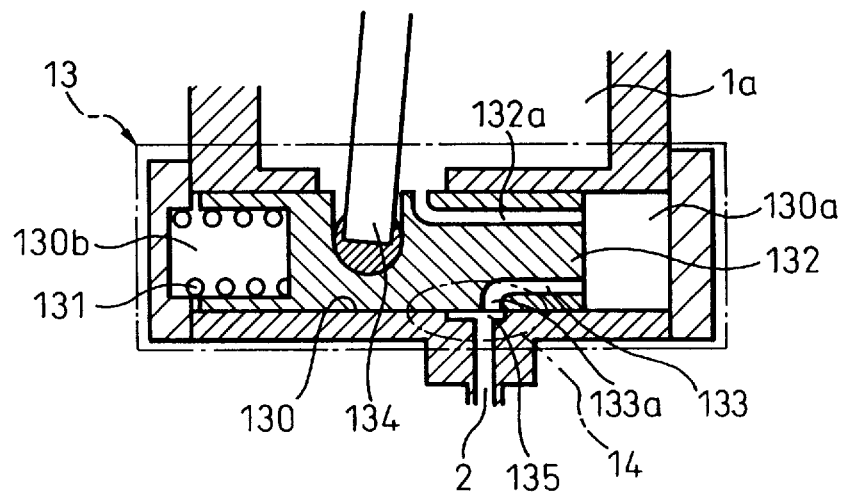
FIG. 14 is a front sectional view showing the HC takeout portion of the second embodiment.
Figure 15A:
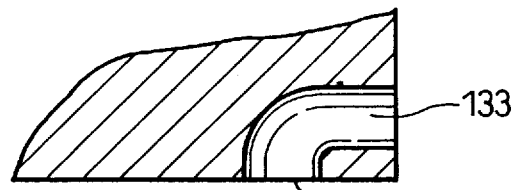
FIG. 15A is a front sectional view showing an enlargement of one part of FIG. 14.

As shown in FIG. 14, the automatic timer 13 is provided with a timer piston 132 which can slidably move while being biased rightward in the figure by a timer spring 131 in a timer cylinder 130 provided adjacent to the low pressure chamber 1a of the fuel injection pump 1. An oil pressure chamber 130a formed on the right side of the timer piston 132 in the timer cylinder 130 is communicated with the low pressure chamber 1a on which the feed pressure acts via a passage 132a. Further, a chamber 130b on the left side of the timer piston 132 in the timer cylinder 130 in which the timer spring 131 is installed is communicated with the intake side of the feed pump via a not illustrated passage.

Accordingly, the oil pressure chamber 130a is subjected to the pressure of the low pressure chamber la equal to the exhaust pressure of the feed pump changing in accordance with the speed of the engine, that is, subjected to the feed pressure, so the timer piston 132 moves to the timer spring 131 side in accordance with the change of the feed pressure.

Figure 15B:
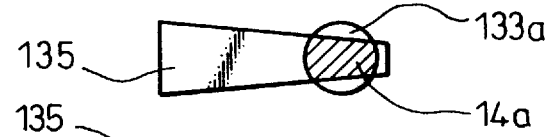
FIG. 15B is a conceptual plan view of one part of FIG. 14.
Figure 15C:
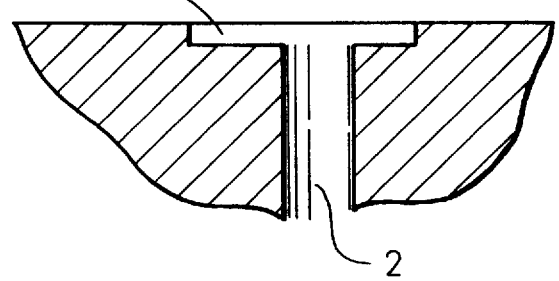
FIG. 15C is a front sectional view showing an enlargement of one part of FIG. 14.

As a characteristic feature of the second embodiment of the present invention, in the timer piston 132, an HC supply port 133 communicated with the oil pressure chamber 130a is formed. An opening 133a of the terminal end thereof is formed in the sliding surface of the timer piston 132. In association with the opening 133a, a groove 135 as shown in FIG. 15B, in the form of for example a triangle, is formed in the cylindrical surface of the timer cylinder 130. The groove 135 is communicated with the supply line 2 communicated with the HC supplying device 5 similar to the case of the first embodiment. In this case, a variable throttle 14 is formed wherein the area of the opening 133a of the HC supplying port 133 opening with respect to the triangular groove 135 is changed due to the displacement of the timer piston 132.

As mentioned before, the timer piston 132 displaces by receiving the feed pressure which substantially changes in accordance with the rotational speed of the fuel injection pump 1. Therefore, if it is constituted as in the second embodiment, when the rotational speed of the pump 1 becomes high, the opening area 14a of the variable throttle 14 changes as in (d), (c), and (b) of FIG. 16 indicating the movement of the timer piston 132, and accordingly the opening 133a of the HC supplying port 133 and the change of the effective area of opening 14a accompanied with this, whereby the amount of fuel to be supplied to the HC supplying device 5, that is, of supply of HC is increased. Further, when the rotational speed becomes further higher and the temperature of the inflowing gas exceeds the usage zone of the $NO_x$ catalyst, it is also possible to throttle the HC supply as shown in (a) of FIG. 16. The dimensions of the opening 133a and the triangular groove 135 are adequately set in accordance with the dimensions of the catalyst and usage circumstances.

The temperature of the gas flowing into the catalyst 6 rises together with the increase of load. Accordingly, desirably the amount of supply of the HC is adjusted in accordance with the load. The load sensing timer operates so as to move the timer piston 132 from the angle delay side to the angle advance side by the rise of the feed pressure along with the rise of the load. When utilizing this operation, the adjustment of the amount of supply of the HC with respect to the load can be carried out. Next, this operation will be concretely explained by using FIG. 16.

Figure 16:
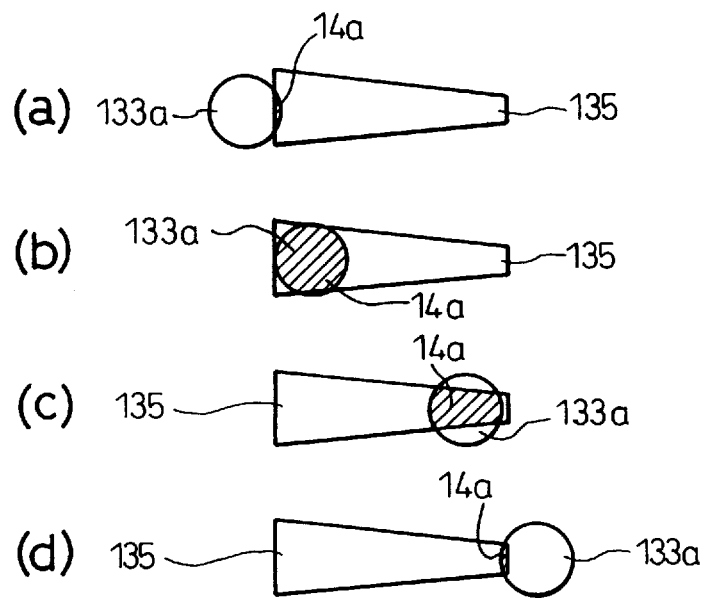
FIG. 16 is a graph illustrating the change of the opening position of the timer piston of the second embodiment and the change of the amount of supply of HC corresponding to the opening position as the operation characteristic thereof.

At a certain engine speed, when the load of the engine is low and also the temperature of the gas flowing into the catalyst is low, the opening 133a of the HC supply port 133 indicated by the hatching in FIG. 16 is positioned on the right side, not shown in any of (a) to (d) of FIG. 16, and fully closed, so the effective area of opening 14a is zero.

Next, when only the load starts to rise, the timer piston 132 starts the movement to the angle advance side, the opening area 14a appears as in (d) of FIG. 16, and the supply of HC starts. Then, along with the increase of the load, the opening area 14a expands as in (c) and (b) and the amount of supply of the HC is increased.

When the load is further increased and the inflowing gas temperature rises to such an extent that it is difficult for the $NO_x$ catalyst to purify $NO_x$ or the $NO_x$ catalyst does not purify the $NO_x$, as in (a), the opening area 14a is reduced and finally advances to the position on the left side not shown in any of (a) to (d), the opening 133a is closed, and the supply of HC from the supply line 2 stops. By this, the wasteful supply of HC is restricted or prevented.

The above series of operations is commenced from the relatively low load state since the feed pressure of fuel rises together with the rise of the engine speed. The temperature of the gas flowing into the catalyst 6 rises as the speed of the engine becomes higher when the load is the same, so the adjustment of the amount of supply of HC becomes possible in all operating regions of the engine.

In this way, according to the present invention, the supply of just enough HC corresponding to the operating condition of the engine becomes possible by a relatively simple means. Therefore, the exhaust gas can be sufficiently purified without wasting the fuel by a simple and convenient system of low cost.

We claim:

1. An exhaust purification apparatus provided in an exhaust system of the internal combustion engine, comprising:
   an exhaust purification device which includes a catalyst assisted in action by a hydrocarbon supplied as a reduction agent, and
   an HC supplementing device mounted in said exhaust purification apparatus for supplying the hydrocarbon into exhaust gas flowing into said exhaust purification device, wherein said HC supplementing device comprises:
   an HC takeout portion which takes out one part of the fuel pressurized by a feed pump supplying fuel to a fuel injection pump and provides fuel to an HC supply line under a feed pressure changing in accordance with the operating condition of said internal combustion engine, and
   an HC supplying device provided where an end of said supply line is opened upstream of said exhaust purification device of said exhaust system to supply an amount of the hydrocarbon into said exhaust purification device determined by said feed pressure changing in accordance with the operating condition of said internal combustion engine.

2. An exhaust purification apparatus as set forth in claim 1, wherein said HC takeout portion is mounted in a drain portion provided in a low pressure chamber of said fuel injection pump.

3. An exhaust purification apparatus as set forth in claim 1, wherein said HC takeout portion is mounted in an automatic timer of said fuel injection pump.

4. An exhaust purification apparatus as set forth in claim 1, wherein said HC supplying device includes an electrically heated heat generator.

5. An exhaust purification apparatus as set forth in claim 1, further comprising a control valve provided in the middle of said supply line.

6. An exhaust purification apparatus as set forth in claim 5, further comprising a control circuit for controlling said control valve.

7. An exhaust purification apparatus as set forth in claim 6, further comprising an exhaust temperature sensor provided upstream of said exhaust purification device of the exhaust system of said internal combustion engine, an output signal of said exhaust temperature sensor being input to said control circuit.

8. An exhaust purification apparatus as set forth in claim 1, further comprising a throttle portion provided in the middle of said HC supply line.

9. An exhaust purification apparatus as set forth in claim 8, further comprising a control valve provided in the middle of said supply line.

10. An exhaust purification apparatus as set forth in claim 9, further comprising a control circuit for controlling said control valve.

11. An exhaust purification apparatus as set forth in claim 10, further comprising an exhaust temperature sensor provided upstream of said exhaust purification device of the exhaust system of said internal combustion engine, an output signal of said exhaust temperature sensor being input to said control circuit.

12. An exhaust purification apparatus as set forth in claim 8, wherein said throttle portion is a variable throttle with an opening area which changes in accordance with the operating condition of said internal combustion engine.

13. An exhaust purification apparatus as set forth in claim 12, further comprising a control valve provided in the middle of said supply line.

14. An exhaust purification apparatus as set forth in claim 13, further comprising a control circuit for controlling said control valve.

15. An exhaust purification apparatus as set forth in claim 14, further comprising an exhaust temperature sensor provided upstream of said exhaust purification device of the exhaust system of said internal combustion engine, an output signal of said exhaust temperature sensor being input to said control circuit.

16. An exhaust purification apparatus provided in an exhaust system of the internal combustion engine, comprising:
    an exhaust purification device for purifying exhaust gas from said internal combustion engine, and
    an HC supplementing device mounted in said exhaust purification apparatus for supplying a hydrocarbon into the exhaust gas flowing into said exhaust purification device for assisting the function of said device, wherein said HC supplementing device comprises:
        an HC takeout portion which takes out one part of the fuel pressurized by a feed pump supplying fuel to a fuel injection pump and provides fuel to an HC supply line under a feed pressure changing in accordance with the operating condition of said internal combustion engine,
        an HC supplying device provided where an end of said supply line is opened upstream of said exhaust purification device of said exhaust system, and
        a throttle portion provided in the middle of said HC supply line, said throttle portion being a variable throttle with an opening area which changes in accordance with the operating condition of said internal combustion engine.

17. An exhaust purification apparatus as set forth in claim 13, wherein said exhaust purification device includes a catalyst.

18. An exhaust purification apparatus as set forth in claim 13, wherein said HC takeout portion is mounted in a drain portion provided in the low pressure chamber of said fuel injection pump.

19. An exhaust purification apparatus as set forth in claim 13, wherein said HC takeout portion is mounted in an automatic timer of said fuel injection pump.

20. An exhaust purification apparatus as set forth in claim 13, wherein said HC supplying device includes an electrically heated heat generator.

21. An exhaust purification apparatus as set forth in claim 16, further comprising a control valve provided in the middle of said supply line.

22. An exhaust purification apparatus as set forth in claim 21, further comprising a control circuit for controlling said control valve.

23. An exhaust purification apparatus as set forth in claim 22, further comprising an exhaust temperature sensor provided upstream of said exhaust purification device of the exhaust system of said internal combustion engine, an output signal of said exhaust temperature sensor being input to said control circuit.

24. An exhaust purification apparatus provided in an exhaust system of the internal combustion engine, comprising:
    an exhaust purification device for purifying exhaust gas from said internal combustion engine, and
    an HC supplementing device mounted in said exhaust purification apparatus for supplying a hydrocarbon into the exhaust gas flowing into said exhaust purification device for assisting the function of said device, wherein said HC supplementing device comprises:
        an HC takeout portion which takes out one part of the fuel pressurized by a feed pump supplying fuel to a fuel injection pump and provides fuel to an HC supply line under a feed pressure changing in accordance with the operating condition of said internal combustion engine, and
        an HC supplying device provided where an end of said supply line is opened upstream of said exhaust purification device of said exhaust system, wherein said HC takeout portion is mounted in a drain portion provided in a low pressure chamber of said fuel injection pump.

25. An exhaust purification apparatus as set forth in claim 24, wherein said exhaust purification device includes a catalyst.

26. An exhaust purification apparatus as set forth in claim 24, wherein said HC supplying device includes an electrically heated heat generator.

27. An exhaust purification apparatus as set forth in claim 24, further comprising a control valve provided in the middle of said supply line.

28. An exhaust purification apparatus as set forth in claim 27, further comprising a control circuit for controlling said control valve.

29. An exhaust purification apparatus as set forth in claim 24, further comprising a throttle portion provided in the middle of said HC supply line.

30. An exhaust purification apparatus as set forth in claim 29, further comprising a control valve in the middle of said supply line.

31. An exhaust purification apparatus as set forth in claim 30, further comprising a control circuit for controlling said control valve.

32. An exhaust purification apparatus provided in an exhaust system of the internal combustion engine, comprising:
    an exhaust purification device for purifying exhaust gas from said internal combustion engine, and
    an HC supplementing device mounted in said exhaust purification apparatus for supplying a hydrocarbon into the exhaust gas flowing into said exhaust purification device for assisting the function of said device, wherein said HC supplementing device comprises:
        an HC takeout portion which takes out one part of the fuel pressurized by a feed pump supplying fuel to a fuel injection pump and provides fuel to an HC supply line under a feed pressure changing in accordance with the operating condition of said internal combustion engine, and
        an HC supplying device provided where an end of said supply line is opened upstream of said exhaust purification device of said exhaust system, wherein said HC takeout portion is mounted in an automatic timer of said fuel injection pump.

33. An exhaust purification apparatus as set forth in claim 32, wherein said exhaust purification device includes a catalyst.

34. An exhaust purification apparatus as set forth in claim 32, wherein said HC supply device includes an electrically heated heat generator.

35. An exhaust purification apparatus as set forth in claim 32, further comprising a throttle portion provided in the middle of said HC supply line.

36. An exhaust purification apparatus as set forth in claim 35, further comprising a control valve is provided in the middle of said supply line.

37. An exhaust purification apparatus as set forth in claim 36, further comprising a control circuit for controlling said control valve.

38. An exhaust purification apparatus as set forth in claim 37, further comprising an exhaust temperature sensor provided upstream of said exhaust purification device of the exhaust system of said internal combustion engine, an output signal of said exhaust temperature sensor being input to said control circuit.

* * * * *